United States Patent [19]

Peter

[11] Patent Number: 5,355,665

[45] Date of Patent: Oct. 18, 1994

[54] FULL FLOTATION MOWER DECK

[75] Inventor: Tim Peter, Medina, Ohio

[73] Assignee: MTD Products Inc.

[21] Appl. No.: 46,647

[22] Filed: Apr. 13, 1993

[51] Int. Cl.$^5$ ............................................. A01D 34/74
[52] U.S. Cl. ..................................... 56/15.8; 56/17.1; 56/DIG. 22
[58] Field of Search ................. 56/6, 15.8, 16.7, 17.1, 56/17.2, 17.5, DIG. 22, DIG. 10

[56] References Cited

U.S. PATENT DOCUMENTS

| | | | |
|---|---|---|---|
| 3,077,065 | 2/1963 | Samways et al. | 56/DIG. 22 X |
| 3,433,498 | 3/1969 | Irgens | 56/16.7 X |
| 4,325,211 | 4/1982 | Witt et al. | 56/DIG. 22 X |
| 4,962,636 | 10/1990 | Sampei et al. | 56/17.1 |
| 5,065,568 | 11/1991 | Braun et al. | 56/14.9 |

*Primary Examiner*—David J. Bagnell
*Attorney, Agent, or Firm*—Lightbody & Lucas

[57] ABSTRACT

A full flotation mower deck for a rear engine walk behind lawn mower, such flotation deck including a fixed frame having a pivoting axle, with the mower deck independently supported by anti-scalping wheels and interconnected to the frame by pins with a separate mechanical interconnection between the mower deck and the frame for forward and aft movement in respect thereto.

10 Claims, 3 Drawing Sheets

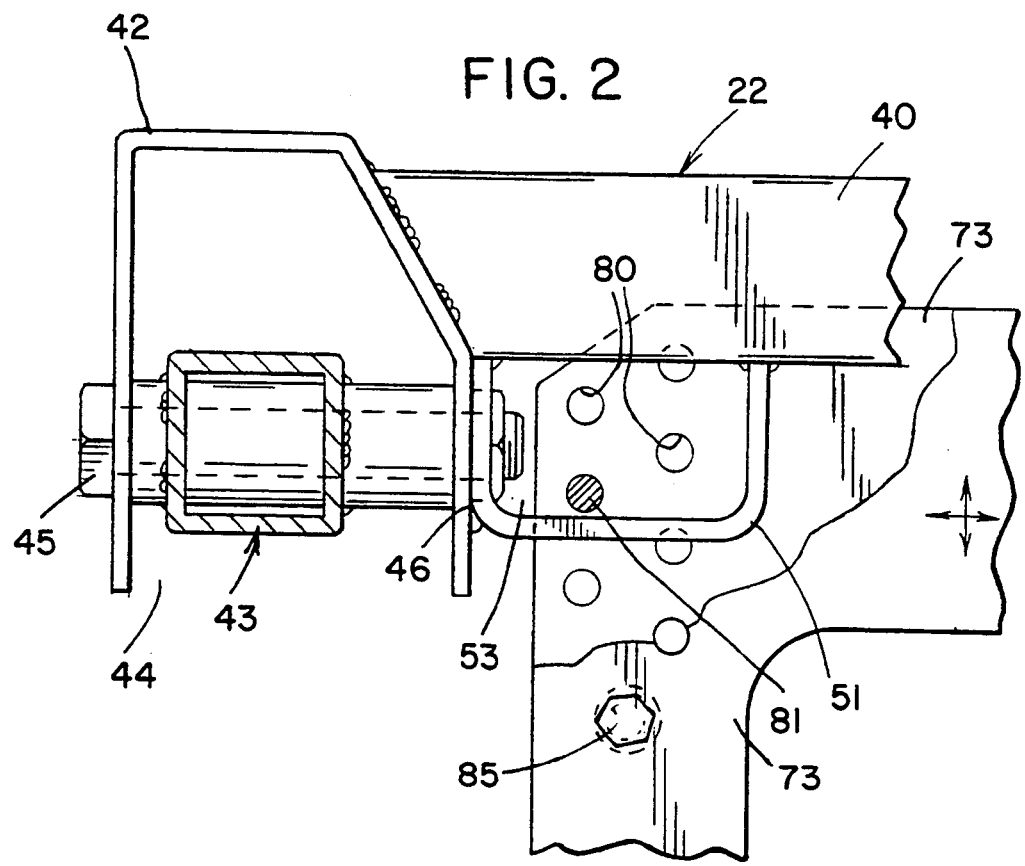
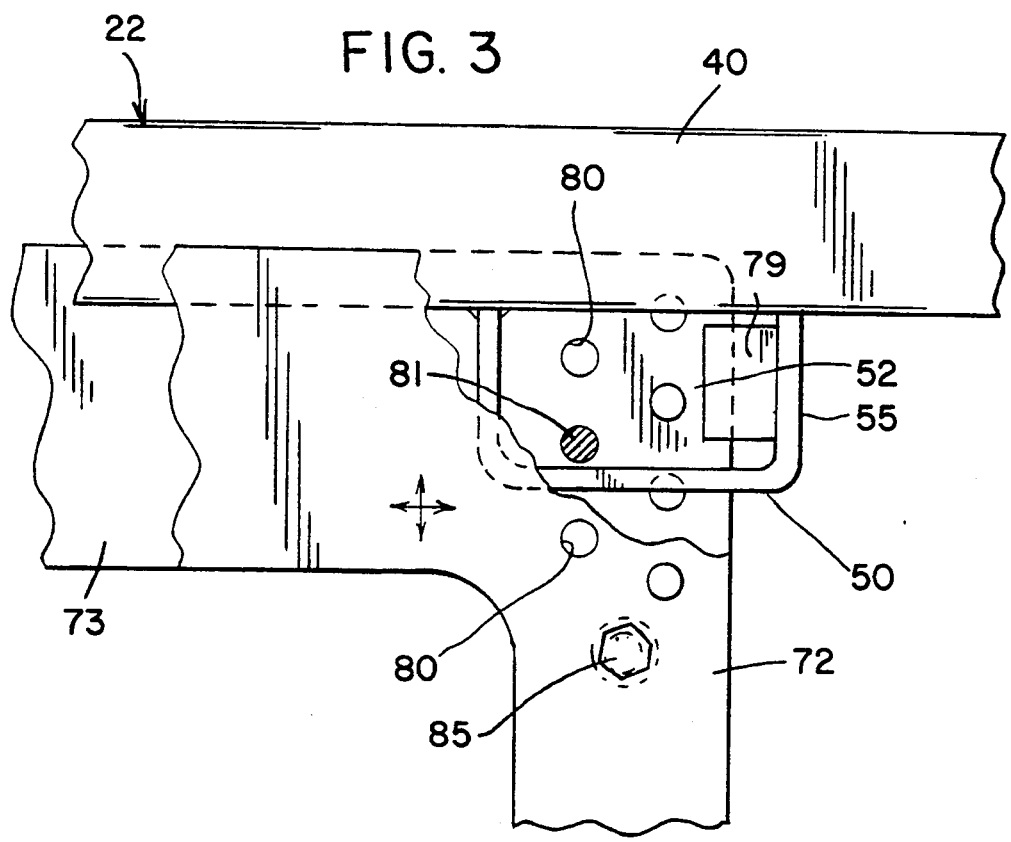

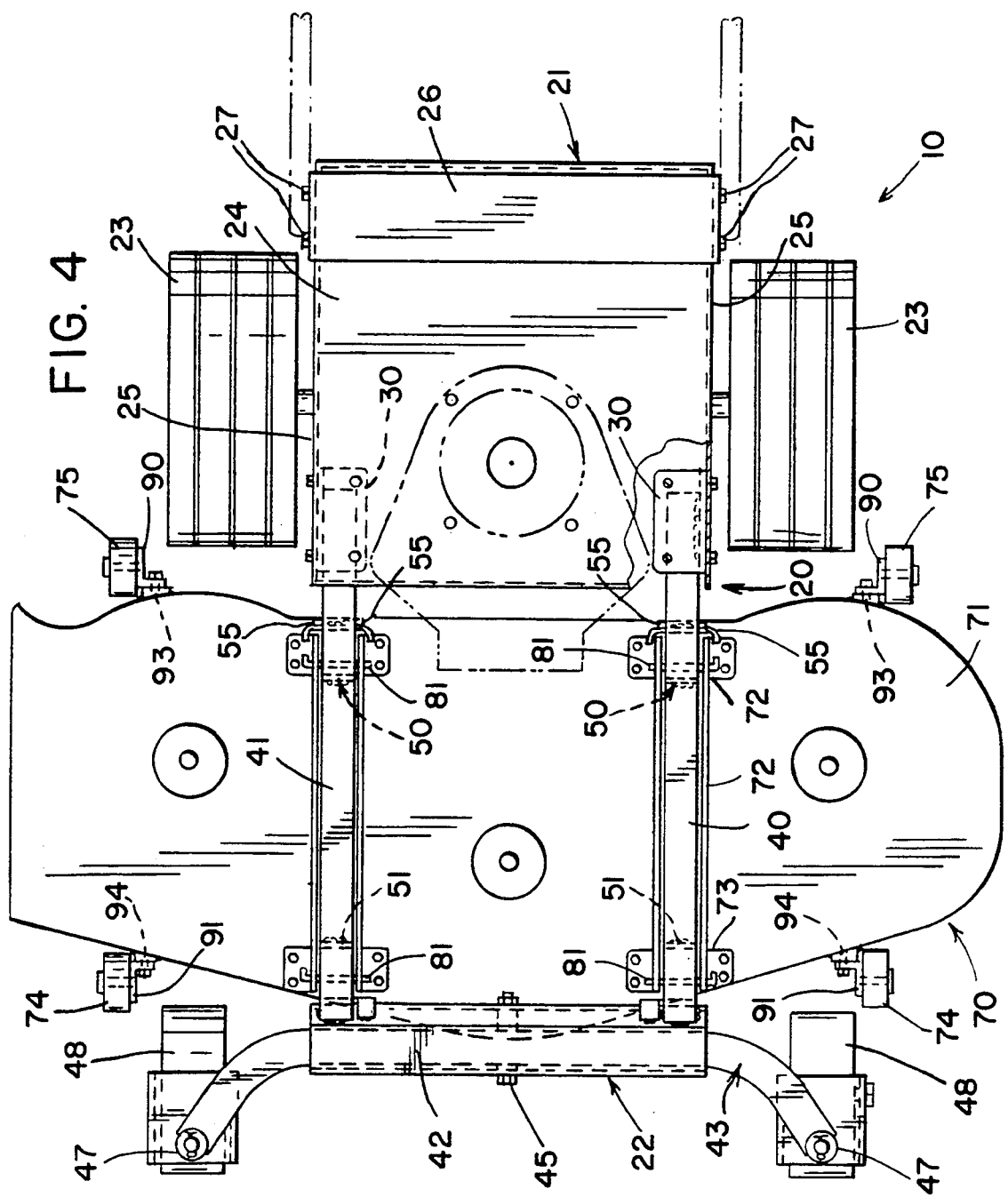

FULL FLOTATION MOWER DECK

FIELD OF THE INVENTION

This invention relates to the mounting of a mower deck to a lawn and garden mower and, more particularly, to forward deck walk behind lawn mowers.

BACKGROUND OF THE INVENTION

Lawn and garden mowers typically have rotary blade mowing decks for usage therewith. Typically these decks are either fixedly connected to the frame between forward wheels and aft drive wheels or have some sort of semi-floating interconnection between a fixed frame and the cutting unit. Examples of these include U.S. Pat. Nos. 3,154,903, 3,375,645, and 4,325,211. Typically in these units, the mower deck has some sort of lost motion interconnection between the mower deck and a wheeled frame, which loss motion interconnection allows for the independent movement of the mower deck in respect to the units frame.

OBJECTS AND SUMMARY OF THE INVENTION

It is an object of the present invention to provide for a full flotation mower deck.

It is another object of the present invention to simplify the construction of a lawn mower including a mower deck.

It is yet another object of the present invention to allow for the independent movement of a mower deck in respect to all of the lawn mower wheels.

It is still another object of the present invention to strengthen the construction of lawn mowers including mower deck.

It is a further object of this invention to increase the longevity of lawn mowers including mower decks.

It is a still a further object of this invention to reduce the weight of lawn mowers including mower decks.

Other objects and a more complete understanding of the invention may be had by referring to the drawings.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIGS. 2 and 3 are enlarged partial side views of the mounting brackets of the lawn mower of FIG. 1; and, FIG. 4 is a downward view of the frame and mower deck of the mid mount mower of FIG. 1.

DETAILED DESCRIPTION OF THE INVENTION

Figure 1:
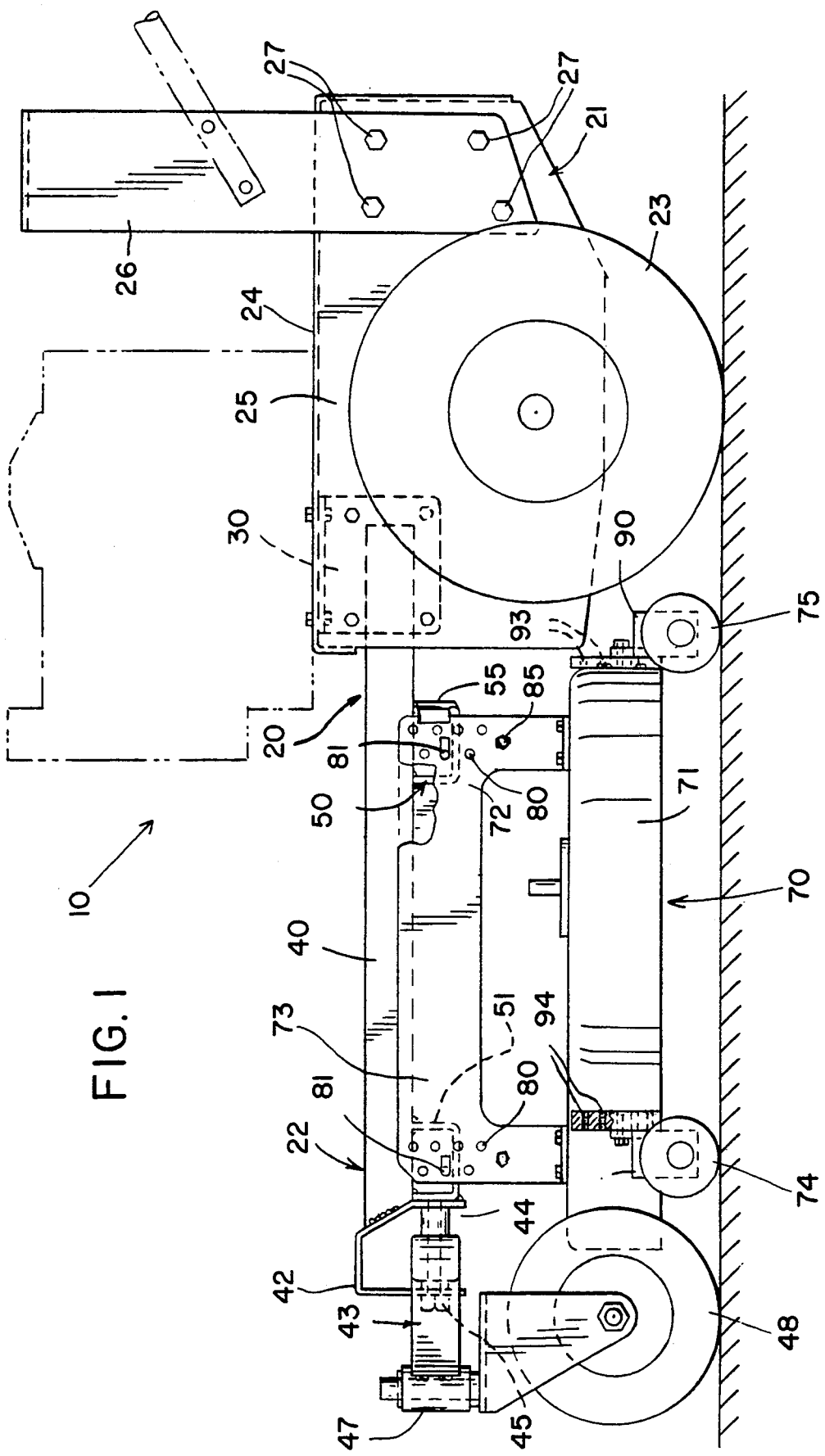
FIG. 1 is a side view of a mid mount walk behind lawn mower incorporating the invention of the application.

The mower deck of this invention is designed for use with a lawn mower 10. The lawn mower 10 includes a frame 20 and a mower deck 70.

The frame 20 of the vehicle 10 includes an aft section 21 and a forward section 22. The aft section 21 serves for mounting the handlebars, engine, transmission, and the various clutches needed to operate the lawn mower. For clarity of presentation, these items are shown in phantom form in the figures in that they do not form a direct part of the invention. Two back drive wheels 23 extend off of either side of the aft section 21. These two wheels 23 are selectively interconnected through clutches and variable speed mechanisms to the engine in one of a variety of manners well known in the art. The direction speed of rotation and braking condition of the wheels 23 is under the control of the operator. The aft section 21 itself is a generally rectangular unit having a flat top 24 with sides 25 downwardly extending therefrom. The sides 25 are fixedly connected to each other and to the flat top 24 so as to provide for a solid rectangular box member as the aft section 21. In the embodiment shown, this aft section 21 is of $\frac{1}{8}''$ plate steel formed and then welded together having 24×24×10'' total dimensions. A large "U" shaped member 26 is fixedly connected to the aft section 21 so as to form a mounting location for the handlebars, fuel tank, and other secondary components of the lawn mower 10. Again, in the preferred embodiment, this is a $\frac{1}{4}''$ thick steel section, 5'' wide raised 8'' from the top 24, fixedly connected to the sides 25 of the aft section 21 by eight bolts 27. Due to the fact that the bottom of the aft section 21 is open, installation and maintenance of the secondary components such as clutches, transmissions, belts, and other secondary components is facilitated. Two generally "L" shaped reinforcing flanges 30 are fixedly connected to the aft section 21 near the forward end thereof. These reinforcing flanges 30 add additional strength against flexing at the interconnection between the aft section 21 and the forward section 22. The particular reinforcing flanges 30 disclosed are made of $\frac{1}{4}''$ steel 6'' wide and $5+\frac{1}{4}''$ deep which are bolted to the top 24 and the sides 25 of the aft section 21.

The forward section 22 is fixedly connected to the aft section 21 so as to complete the frame 20 of the lawn mower 10. The forward section 22 itself is made up of two rails 40, 41, a leading member 42, and a swing axle 43. The rails 40, 41 are fixedly welded to the leading member 42 at one end and fixedly welded to the reinforcing flange 30 which is fixedly bolted to the sides 25 of the aft section 21 at the back end. The rails 40, 41 thus serve to fixedly tie the forward section 22 to the aft section 21 to form the fixed, generally open center, rectangular shaped frame 20.

The rails 40, 41 in the embodiment shown are 2'' square tubing some 22'' in total length. The leading member 42 is an inverted modified "U" shaped member having 3/16'' thick walls, some 2' in length and 4'' deep. The bottom portion 44 of the leading member 42 is open.

The swing axle 43 is physically located in this open bottom section 44 of the leading member 42 with a pivot bolt 45 interconnecting the two. The pivot bolt 45 interconnection allows the axle 43 to pivot substantially 7° in either direction of a central neutral position in respect to the leading member 42. This reduces the stresses on the frame 20 in contrast to units wherein the axle is fixedly connected to the frame. The swing axle 43 in the embodiment shown is 2'' square tubing some 35'' in length. The ends 47 of the swing axle 43 are bent forward so as to provide clearance between the later described wheels 48 and the mower deck 70. This shortens the length of the frame 20 by allowing the forward section 22 to be located more rearwardly than otherwise.

Two pivoting wheels 48 mounted to opposing ends 47 of the axle 43 complete the frame 20 of the lawn mower 10. The location of the axle of the wheels 48 behind the pivot connection to the ends 47 of the axle allow the wheels 48 to track, that is automatically adjust for the direction in which the lawn mower 10 is headed. This further reduces the strain on the frame 20.

Two generally "U" shaped sideward opening brackets 50, 51 extend downwardly off of the rails 40, 41, respectively, intermediate to the ends thereof. These generally "U" shaped brackets 50, 51 are fixed to the rails 40, 41 in the preferred embodiment by welding the upper ends of the "U" to the bottom surface of the rails 40, 41. This fixedly interconnects the "U" shaped brackets 50, 51 to the rails 40, 41 forming two areas of enclosure 52, 53, respectively (purpose later described). The back edge 55 of the "U" shaped bracket 50 extends outwardly of the rails 40, 41 so as to provide for small ear shaped flanges. These flanges cooperate with back brackets on the mower deck 70 so as to interconnect the mower deck 70 to the frame 20 for forward movement in respect thereto. The trailing edge 46 of the leading member 42 of the frame 20 provides a similar function in respect to the forward brackets on the mower deck 70. Reverse ear shaped flanges off the forward brackets or additional means (such as forward ears on the back brackets 72) could be utilized if desired, as could other means of interconnecting the deck brackets 72, 73 to the frame.

The mower deck 70 itself includes a deck section 71, two upwardly extending brackets 72, 73 and forward 74 and trailing 75 guide wheels. The deck 71 is a conventional mowing deck adapted for use with the invention primarily by the use of the brackets and the use of the guide wheels. This deck 71 can be single or multiple spindles. The particular mower deck shown is a 54" triple spindle mower deck having a leading central spindle. The spindles are rotatively connected to the engine so as to provide power to the mower blades of the deck. The deck 71 is mounted to the frame 20 of the lawn mower 10 via the two brackets 72, 73. These brackets 72, 73 are fixedly connected to the upper surface of the mower deck 71 such that the entire weight of the mower deck can be supported thereby. The particular brackets 72, 73 disclosed are generally "U" shaped brackets having sides extending generally beside and parallel so the sides of the rails 40, 41 of the frame. The distance between the sides of the brackets 72, 73 is approximately equal to the width of the rails 40, 41 (both inner and outer dimensions). Each side of the brackets 72, 73 extends upwardly immediately adjacent to the areas of enclosure 52, 53, respectively, of the "U" shaped brackets 50, 51 which are fixedly connected to the rails 40, 41. The brackets 72, 73 are tied together at their tops to increase their rigidity. Each bracket 72, 73 are tied together in a sideward direction by a bolt and spacer assembly 85 a distance upwards from the bottom thereof. This assembly increases the sideward rigidity of the brackets.

Each of the sides of the brackets 72, 73 are drilled with holes for the insertion of a quick disconnect pin or bolt. These holes 80 are preferably staggered in respect to each other such that a large range of precise height adjustment may be accommodated by the holes 80. The length of the pin 81 to its locking mechanism is a little more than the width of the brackets 72, 73. This strengthens the brackets 72, 73 against sideward forces by tying the sides of the brackets together. Upon the insertion of a pin 81 into the holes 80 through the respective area of enclosure, the brackets 72, 73 are selectively interconnected to the "U" shaped brackets 50, 51 of the frame 20 so as to allow movement upwards from a fixed lower cutting height position in respect thereto. The fixed lower cutting height position is determined by the physical contact between the pin 81 and the bottom surface of the respective bracket 50, 51. Depending on height of cut, the upper position is determined by contact between the spacer assembly 85 and the bottom of the brackets 50, 51 or pin 81 contact with bottom of rails 40, 41. With this design, the deck 71 can be moved upwards from the height set by such pin 81 to the extent of the complete space between the assembly 85 and the brackets 52, 53, respectively, before there is a solid upward interconnection between the deck 71 and the frame 20. This allows for floating between the deck 70 and the frame 20 to the extent of the height of the area of enclosure. Note that the pin 81 in the preferred embodiment disclosed is not utilized in connecting the deck 71 to the frame 20 for forward and reverse movement of the lawn mower 10. This separation of functions allows staggered holes 80 to be utilized, thus strengthening this interconnection by allowing the holes 80 to be more widely separated for the same accuracy of adjustment. Also, the pins 81 are not subjected to forward/aft forces, and thus can be made smaller and easier to use than otherwise possible. The pins 81 also do not have to restrain the deck 71 against belt tightening forces on the spindle drive, thus significantly easing adjustment of the pins 81. For example, electro-magnetic and other constant belt tension interconnects can be used without compromising height adjustment.

The guide anti-scalp wheels 74, 75 allow for scraping protection for lawn mower 10 disclosed. This is provided by the fact that the guide wheels have a flange 90, 91, respectively, which can be selectively bolted to the deck 71 at various positions in respect thereto. By selecting a particular hole from a range of holes 93, 94, respectively, the height of scraping protection for the lawn mower 10 can be selectively chosen fore and aft independently if desired. In this respect it is noted that the pin 81 is used to set mowing height by respective contact with the bottom of the "U" shaped brackets 50, 51 when the lawn mower 10 is on a level surface with its guide wheels 74, 75 preferably adjusted for this given mowing height. This allows the anti-scalping wheels 74, 75 to be the secondary determinant of the height of cutting of the lawn mower while providing for a full floating interconnection deck 70 to frame 20.

The mower deck 70 is interconnected to the frame 20 for forward and reverse movement therewith by the use of the flanges extending off of the back edge 55 of the rear bracket and the edge of the leading member 42 in respect to the front bracket 51. In the preferred embodiment disclosed, the edges 55 are reinforced by a bolt on eared wear plate 79. This wear plate lengthens the service life of the mower 10 while also strengthening the bracket interconnection against both rearward and sideward loads. The bracket 72, 73 from the mower deck 71 solidly interconnects upon significant forward or reverse movement between the mower deck 70 and the frame 20. This ties the mower deck 70 to the frame for forward and reverse movement in respect thereto.

Although this invention has been described in its preferred embodiment with a certain degree of particularity, it is to be understood that numerous changes can be made without deviating from the invention as hereinafter claimed.

What is claimed:

1. A free flotation mower deck for a walk behind mower, said walk behind mower including a frame having an aft section and a forward section fixedly interconnected by rails,
- a front axle, said front axle being connected to said forward section of said frame, said front axle having wheels to the ground so as to support the forward section of the frame,
- forward and aft "U" shaped brackets, said "U" shaped brackets attached to said rails so as to create areas of enclosure,
- deck brackets, said deck brackets extending upwards off of the mower deck, said deck brackets having holes therein respectively, pins selectively insertable through said holes and into said areas of enclosures so as to interconnect said deck brackets to said frame in a lost motion type interconnection,
- and means other than said pins to interconnect said deck brackets to said frame or said "U" shaped brackets extending therefrom so as to prevent the aft movement of said deck brackets in respect thereto.

2. The improved full flotation mower deck of claim 1 characterized by the addition of forward and aft anti-scalping wheels, said forward and aft anti-scalping wheels being selectively interconnected to said deck so as to provide for anti-scalping protection for the mower.

3. The improved full flotation mower deck of claim 1 characterized by reinforcing flanges, and said reinforcing flanges reinforcing the interconnection between said rails and said aft section of said frame.

4. The improved full flotation mower deck of claim 1 characterized in that said front axle is a swing axle having a single center point, and said single center point being pivotally connected to said forward section of said frame, but not the mower deck, for lateral pivoting in respect to said forward section.

5. The improved full flotation mower deck of claim 1 characterized in that said means other than said pins to interconnect said deck brackets to said frame or said "U" shaped bracket extending therefrom include said back walls of the "U" shaped bracket, said back walls extending outwardly so as to provide flanges, and said flanges cooperating with the adjoining said deck brackets on the mower deck so as to interconnect the mower deck to the frame.

6. The improved full flotation mower deck of claim 5 characterized by the addition of an eared wear plate, and said eared wear plate being bolted to said back walls of the "U" shaped bracket to strengthen the interconnection to said deck brackets on the mower deck.

7. A free flotation mower deck for a walk behind mower, said walk behind mower including a frame having an aft section and a forward section fixedly interconnected by rails,
- a swing axle, said swing axle being pivotally connected to said forward section of said frame for lateral pivoting in respect to said forward section, said swing axle having wheels to the ground so as to support the forward section of the frame,
- forward and aft "U" shaped brackets, said "U" shaped brackets suspended below said rails so as to create areas of enclosure,
- deck brackets, said deck brackets extending upwards off of the mower deck, said deck brackets having holes therein respectively, pins selectively insertable through said holes and into said areas of enclosures so as to interconnect said deck brackets to said frame in a lost motion type interconnection,
- and means other than said pins to interconnect said deck brackets to said frame or said "U" shaped brackets extending therefrom so as to prevent the aft movement of said deck brackets in respect thereto.

8. The improved full flotation mower deck of claim 7 characterized by the addition of forward and aft anti-scalping wheels, said forward and aft anti-scalping wheels being selectively interconnected to said deck so as to provide anti-scalping protection for the mower.

9. The improved full flotation mower deck of claim 7 characterized by reinforcing flanges, and said reinforcing flanges reinforcing the interconnection between said rails and said aft section of said frame.

10. A free flotation mower deck for a walk behind mower, said walk behind mower including a frame having an aft section and a forward section fixedly interconnected by rails,
- a swing axle, said swing axle being pivotally connected to said forward section of said frame for lateral pivoting in respect to said forward section, said swing axle having wheels to the ground so as to support the forward section of the frame,
- forward and aft "U" shaped brackets, said "U" shaped brackets suspended below said rails so as to create areas of enclosure,
- deck brackets, said deck brackets extending upwards off of the mower deck, said deck brackets having holes therein respectively, pins selectively insertable through said holes and into said areas of enclosures so as to interconnect said deck brackets to said frame in a lost motion type interconnection,
- means to interconnect said deck brackets to said frame or said "U" shaped brackets extending therefrom so as to prevent the aft movement of said deck brackets in respect thereto,
- and means to interconnect said deck brackets to said forward section so as to prevent the forward movement of said deck brackets in respect thereto.

* * * * *